（12）United States Patent
Yamauchi

(10) Patent No.: US 8,730,365 B2
(45) Date of Patent: *May 20, 2014

(54) IMAGE CAPTURING APPARATUS AND IMAGE CAPTURING SYSTEM

(71) Applicant: Canon Kabushiki Kaisha, Tokyo (JP)

(72) Inventor: Makiko Yamauchi, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/927,765

(22) Filed: Jun. 26, 2013

(65) Prior Publication Data

US 2013/0286267 A1 Oct. 31, 2013

Related U.S. Application Data

(63) Continuation of application No. 11/622,099, filed on Jan. 11, 2007, now Pat. No. 8,493,484.

(30) Foreign Application Priority Data

Jan. 13, 2006 (JP) .................................. 2006-006447

(51) Int. Cl.
H04N 3/14 (2006.01)
H04N 5/20 (2006.01)

(52) U.S. Cl.
USPC .......................................... 348/300; 348/255

(58) Field of Classification Search
USPC ......... 348/294, 255, 300, 302, 303, 308, 311, 348/301, 307
See application file for complete search history.

(56) References Cited

U.S. PATENT DOCUMENTS

| 6,963,371 | B2 * | 11/2005 | Sakurai et al. | 348/301 |
| 7,460,164 | B2 * | 12/2008 | Hyama et al. | 348/300 |
| 7,697,052 | B1 * | 4/2010 | Yamazaki et al. | 348/333.01 |
| 2005/0168603 | A1 * | 8/2005 | Hiyama et al. | 348/294 |
| 2005/0253946 | A1 * | 11/2005 | Shinohara | 348/300 |

* cited by examiner

Primary Examiner — Ahmed A Berhan
(74) Attorney, Agent, or Firm — Cowan, Liebowitz & Latman, P.C.

(57) ABSTRACT

The present invention provides an image capturing apparatus, which comprises a plurality of photoelectric converter-containing pixels that are positioned horizontally and vertically and a gain circuit, has a gain controller that can control the gain of the gain circuit in N stages (where N is an integer equal to or greater than 2). The gain circuit outputs each of a plurality of signals given by the product of the output signal from one of the plurality of pixels and the gain in each stage of the N stages.

6 Claims, 8 Drawing Sheets

IMAGE CAPTURING APPARATUS AND IMAGE CAPTURING SYSTEM

CROSS-REFERENCE TO RELATED APPLICATIONS

This application is a continuation of application Ser. No. 11/622,099, filed Jan. 11, 2007 the entire disclosure of which is hereby incorporated by reference.

BACKGROUND OF THE INVENTION

1. Field of the Invention

The present invention relates to an image capturing apparatus that converts light into electrical signals, and to an image capturing system that comprises the image capturing apparatus.

2. Description of the Related Art

Conventionally, image capturing systems have set gains close to the saturation value in order to improve the S/N ratio. However, due to the characteristic fluctuations of sensors, the predetermined signal range could not be attained even with the gain adjustment conducted in the factory. Further, there were cases in which attempting to attain the predetermined signal range would result in a deteriorating S/N ratio. Here, N (noise) refers to the circuit noise existing outside of the sensor.

Japanese Patent Application Laid-Open No. 2003-101881 discloses a method to enlarge the dynamic range of light detection by applying different gains to the ordinary signal and to the excessive signal respectively.

FIG. 8 is a block diagram of the image capturing system disclosed in Japanese Patent Application Laid-Open No. 2003-101881. Many pixels are positioned in a matrix in a pixel unit 1104. A V selection means 1007 sequentially selects pixel rows. For each pixel of the selected row, in the case of ordinary incident light, the electrical charges accumulated in the photodiode are transferred to the FD unit (charge-voltage converter) through the transfer unit and converted to voltage, then outputted externally through the horizontal signal line 1116 and the output unit 1118A. If the incident light is excessive, the overflow signal charges from the photodiode are converted to a voltage by the FD unit, and is outputted externally through the horizontal signal line 1014 and the output unit 1016. At the row preceding the selection row, the V selection means 1007 resets the FD unit in advance, and ensures that the FD unit can acquire charges corresponding to the amount of the signal charge overflowing from the photodiode. The control circuit 1052 sets, in an appropriate manner, this preceding row, and controls the gain of the output units 1016 and 1118A, each of which have different amps.

However, in Japanese Patent Application Laid-Open No. 2003-101881, for each pixel column, it is necessary to have as many gain circuits as there are gain types. For this reason, noise may result from the fluctuations of the threshold values of the gain circuit, and measures to deal with this problem have been desired.

SUMMARY OF THE INVENTION

The present invention has been made on the basis of the recognition of the above problems, and has as its exemplified object to enlarge the dynamic range and decrease the noise.

The first aspect of the present invention concerns an image capturing apparatus that has a gain circuit and a plurality of photoelectric converter-containing pixels which are positioned horizontally and vertically, and a gain controller that can control the gain of the gain circuit in N stages (where N is an integer equal to or greater than 2). The gain circuit outputs each of a plurality of signals given by the product of the output signal from one of the plurality of pixels and the gain in each of the N stages.

The second aspect of the present invention is that the image capturing system has an optical system and an image capturing apparatus to convert light from the optical system into electric signals.

Further features of the invention will become apparent from the following description of exemplary embodiments with reference to the attached drawings.

DESCRIPTION OF THE EMBODIMENTS

Figure 1:
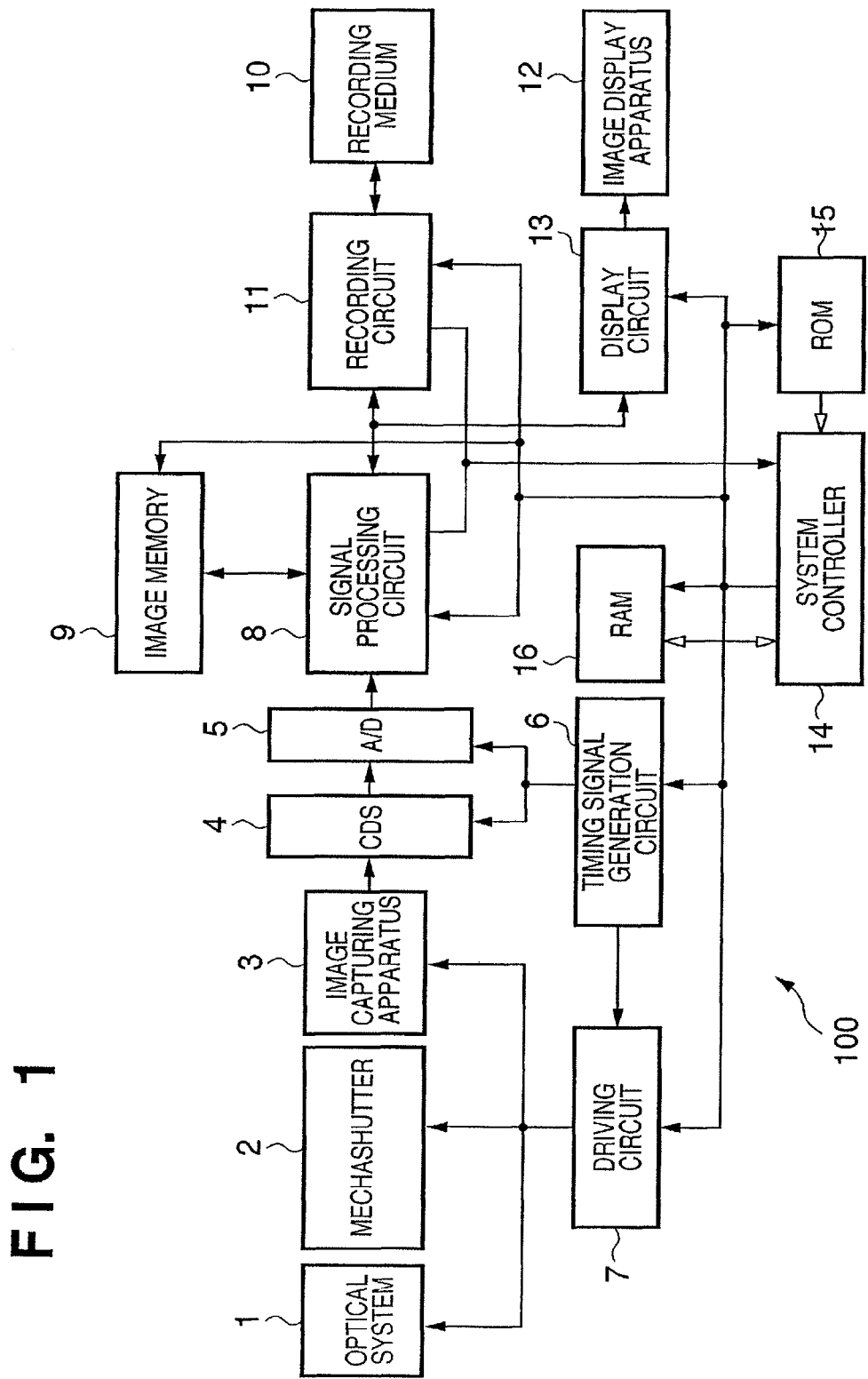
FIG. 1 is a block diagram of the schematic arrangement of the image capturing system according to an embodiment of the present invention.

Preferred embodiments of the present invention will be described in detail with reference to the drawings. FIG. 1 is a block diagram of the arrangement of an image capturing system according to a preferred embodiment of the invention.

An optical system 1 comprises a lens and an aperture. Reference numeral 2 denotes a mechanical shutter (described as "MECHASHUTTER" in FIG. 1). Reference numeral 3 denotes an image capturing apparatus. A CDS circuit 4 performs analog signal processing. An A/D converter 5 converts an analog signal into a digital signal. A timing signal generation circuit 6 generates a signal to operate the image capturing apparatus 3, the CDS circuit 4 and the A/D converter 5. A driving circuit 7 drives the optical system 1, the mechanical shutter 2, and the image capturing apparatus 3. A signal processing circuit 8 performs signal processing necessary for the captured image data. An image memory 9 stores image data that has been signal processed. An image recording medium 10 is configured to be removed from the image capturing system. A recording circuit 11 records signal processed image data onto the image recording medium 10. An image display apparatus 12 displays the signal processed image data. A display circuit 13 is used for displaying images on the image display apparatus 12. A system controller 14 controls the entire image capturing system. A non-volatile memory (ROM) 15 stores a program containing control methods executed by the system controller 14, control data such as parameters and tables, used when the program is executed, and correction data such as failed addresses. A volatile memory (RAM) 16 transfers and stores programs, control data, and correction data stored on the non-volatile memory 15, and utilizes them when the image capturing system is controlled by the system controller 14.

Described below is the image capturing operation using the mechanical shutter 2 of the image capturing system arranged as described above. At the start of the operation of the system controller 14, such as during power-on of the image capturing system, and prior to the image capturing operation, the necessary programs, control data and correction data are transferred from the non-volatile memory 15 and stored in the volatile memory 16. Moreover, these programs and data are used when the system controller 14 controls the image capturing system. In addition, the system controller 14 transfers additional programs and data from the non-volatile memory 15 to the volatile memory 16 if required. Furthermore, the system controller 14 reads out data directly from the non-volatile memory 15 and uses the data.

First, the optical system 1 drives the aperture and lens in response to the control signal from the system controller 14, and forms the object image, which has been set to the appropriate brightness, on the image capturing apparatus 3. Next, the mechanical shutter 2, responding to a control signal from the system controller 14, operates to shield the image capturing apparatus 3 from light in order to ensure that the correct exposure time is reached in accordance with the operation of the image capturing apparatus 3. In this case, if the image capturing apparatus 3 has an electronic shutter function, the necessary exposure time can be secured in conjunction with the mechanical shutter 2. The image capturing apparatus 3 is driven by a drive pulse based on an operation pulse generated by the timing signal generation circuit 6 controlled by the system controller 14, upon which the object image is converted to an electrical signal by photoelectric conversion, followed by the outputting of it as an analog image signal. The analog image signal outputted from the image capturing apparatus 3 has clock synchronized noise removed at the CDS circuit 4 by the operation pulse generated by the timing signal generation circuit 6, which is controlled by the system controller 14. Then, the analog image signal is converted to a digital image signal by the A/D converter 5. Next, by the signal processing circuit 8 controlled by the system controller 14, the digital image signal is subjected to image processes such as color conversion, white balancing, and gamma correction, and processes such as resolution conversion and image compression. The image memory 9 is used for temporarily storing digital image signals during signal processing, and for storing digital image signals that have been signal processed. Image data that has been signal processed by the signal processing circuit 8 or that has been recorded on the image memory 9 is converted by the recording circuit 11 into data (e.g., file system data with a hierarchical structure) that is appropriate for the image recording medium 10 and is recorded onto the image recording medium 10. Further, such image data, after being subjected to resolution conversion by signal processing circuit 8, is converted by the image circuit 13 into a signal that is appropriate for the image display apparatus 12, such as an analog NTSC signal, and is displayed on the image display apparatus 12.

With regard to the signal processing circuit 8, digital image signals may not be signal processed according to the control signal from the system controller 14, but instead may be outputted to the image memory 9 and the recording circuit 11 as image data. In addition, upon receiving a request from the system controller 14, the signal processing circuit 8 outputs to the system controller 14 digital image signals and image data information that were generated during the signal processing. Such information includes the spatial frequency of images, the average value of the designated regions, and the amount of data of compressed images or the information extracted therefrom. Further, the recording circuit 11, upon receiving a request from the system controller 14, outputs to the system controller 14 information concerning the space available and the type of image recording medium 10.

The following is an explanation of the playback operation performed when image data is recorded on the image recording medium 10. The recording circuit 11 reads out image data from the image recording medium 10 according to the control signal from the system controller 14. In a similar manner, based on control signals from the system controller 14, the image processing circuit 8 decompresses images if the image data are compressed, and stores the decompressed data onto the image memory 9. The image data recorded on the image memory 9 is subjected to a resolution conversion process by the signal processing circuit 8, converted to a signal appropriate for the image display apparatus 12 by the display circuit 13, and displayed on the image display apparatus 12.

First Embodiment

Figure 2:
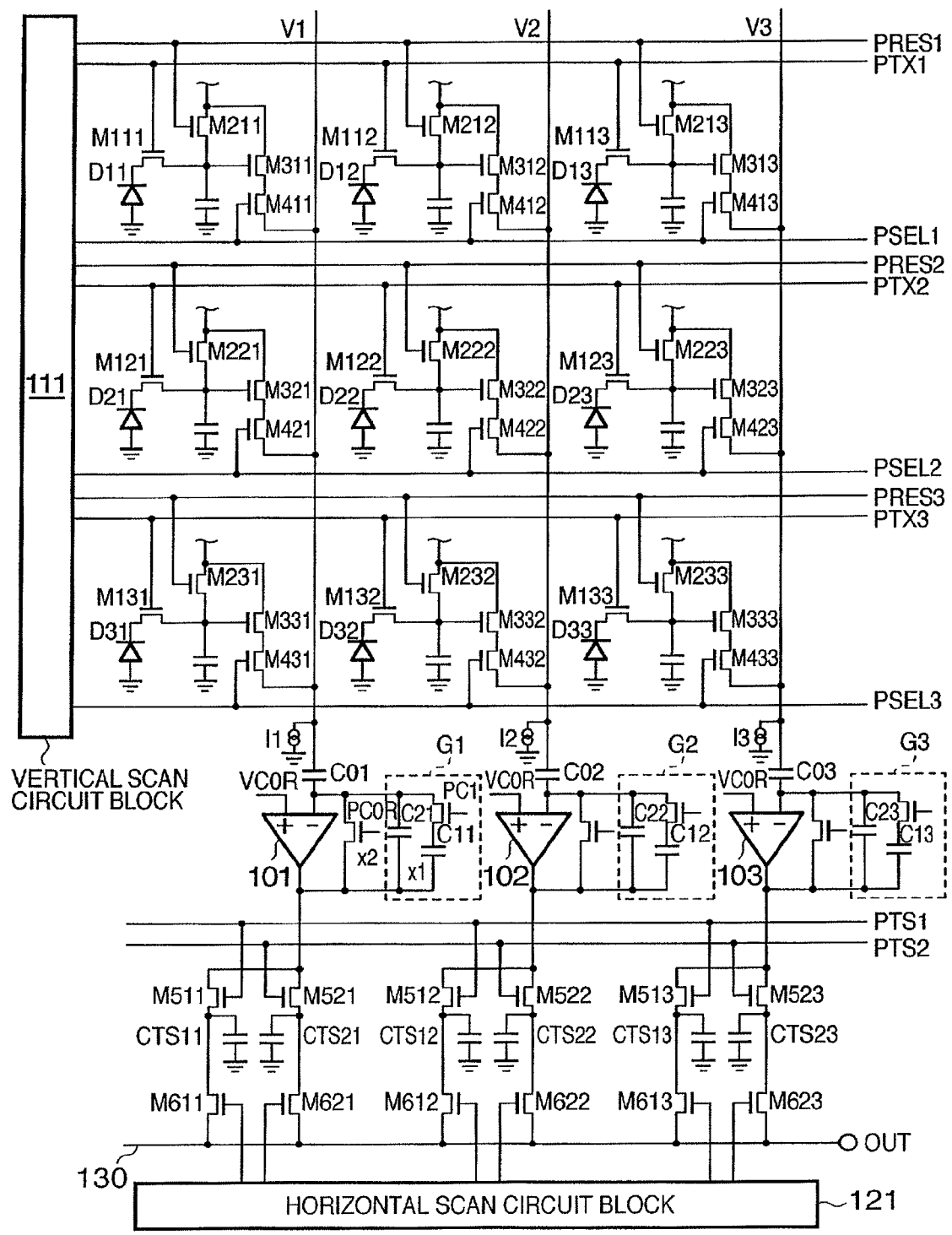
FIG. 2 shows an equivalent circuit of the image capturing apparatus according to a first embodiment of the present invention.

FIG. 2 is an equivalent circuit diagram of the image capturing apparatus according to the preferred first embodiment of the present invention. Each circuit element of the image capturing apparatus in the present embodiment is not limited to this arrangement, but is formed on a semiconductor substrate such as a single crystal silicon substrate through the use of a manufacturing technique for manufacturing semiconductor integrated circuits. Each pixel has a photoelectric conversion element and components such as switching elements and capacitances. For simplicity, FIG. 2 shows an image array with 3 rows and 3 columns, but the size of the image array is not limited to these dimensions.

The configuration of the image capturing apparatus in the present embodiment will be explained with reference to FIG. 2. In this case, photodiodes D11-D33, which act as photoelectric conversion elements that generate optical signals, have their anode side grounded. The cathode side of the photodiodes D11-D33 are connected to the gates of amplification MOS transistors M311-M333 through transfer MOS transistors M311-M333, which are switching elements for transferring optical signal charges accumulated in photodiodes. In order to reset the amplification MOS transistors M311-M333, the reset MOS transistors M211-M233 are connected to the gates of the amplification MOS transistors M311-M333. The drains of the reset MOS transistors M211-M233 are connected to the reset power source. In addition, the drains of the amplification MOS transistors M311-M333 are connected directly to the power source.

The gates of transfer MOS transistors M111, M112, and M113 are connected to a row, selection line PTX1, which is arranged horizontally across the circuit. The row selection line PTX1, as a row selection means, is connected to a vertical scan circuit block 111, and is supplied with a signal voltage according to the timing described below.

Further, the gate of the reset MOS transistor M211 is connected to a row reset line PRES1, which is arranged horizontally across the circuit. The gates of the other reset MOS transistors M212 and M213, which are arranged in other pixel cells in the same row, are also commonly connected to the row reset line PRES1 in a similar manner.

The gate of a selection MOS transistor M411 is connected to a vertical scan line PSEL1, which is arranged horizontally across the circuit. The gates of other selection MOS transistors M412 and M413, which are positioned in other image cells in the same row, are also commonly connected to the same vertical scan line PSEL1 in a similar manner.

Similar to the row selection line PTX1, the row reset line PRES1 and the vertical scan line PSEL1 are connected to the vertical scan circuit block 111, and are supplied with a signal voltage based on the timing described below.

The remaining rows shown in FIG. 2 also comprise similarly arranged image cells, row selection lines, row reset lines, and vertical scan lines. These rows are supplied with PTX2-PTX3, PRES2-PRES3, and PSEL2-PSEL3 generated by the vertical scan circuit block 111.

The source of the amplification MOS transistor M311 is connected to a vertical signal line V1, which is arranged vertically across the circuit, via the selection MOS transistor M411. The sources of the amplification MOS transistors M321 and M331, which are arranged in the same column, are connected to the vertical signal line V1 through selection MOS transistors M421 and M431. The amplification MOS and selection MOS of remaining vertical output lines V2-V3 shown in FIG. 2 are also connected in a similar manner.

The vertical signal line V1 is connected to a constant current source I1, which is a loading means, as well as to the inverting input terminal of an operational amplifier 101 as a gain circuit through a clamp capacitor C01. Further, by supplying PCOR with signal charges based on the timing described below, the clamp operation is performed.

The non-inverting input terminal of the operational amplifier 101 is connected to a clamp voltage VCOR (VREF). A gain controller G1 is connected between the inverting input terminal and the output terminal of the operational amplifier 101. The gain controller G1 is configured to control the gain of the operational amplifier 101 in N stages (note that N is an integer greater than or equal to 2). Through this configuration, the operational amplifier 101 is able to generate each of a plurality of signals given by the product of the output signal from the pixel that includes the photodiode D11 and the gain controlled by the gain controller G1 in each stage of the N stages. The gain controller G1 is configured to control the gain of the operational amplifier 101 in N stages. For example, the gain controller G1 can be configured so as to comprise N circuit elements connected in parallel to the gain circuit, and at least N−1 switching elements connected in series with at least N−1 circuit elements, which may comprise resistances or capacitors. The characteristics (e.g., resistance value or capacitance value) of each circuit element may be identical or different. Moreover, a transistor may be used as the switching element. To each switching element is provided an independent control signal, and its on-off status can be independently controlled. By independently controlling the on-off status of each switching element, the gain of the gain circuit can be controlled in N stages.

FIG. 2 shows by illustration the connection configuration of two capacitors C11 and C21. By supplying a switching element PC1 with a signal voltage based on the timing described below, the gain of the signal is controlled.

The output terminal of the operational amplifier 101 is simultaneously connected to a capacitor CTS11, which temporarily stores optical signals through an optical signal transfer switch M511, and a capacitor CTS21, which temporarily stores optical signals through an optical signal transfer switch M521. The terminals on the opposite sides of optical signal storage capacitors CTS11 and CTS21 are grounded. Moreover, although there are two capacitors for temporarily storing optical signals (i.e., CTS11 and CTS21) in FIG. 2, it is not limited to this configuration. For example, in the case where there are N−1 of the circuit elements, at least N−1 of the capacitors can be arranged, and capacitors equal in number to the number of gains that can be controlled by the gain controller G1 can be used. A similarly configured read out circuit is arranged for the remaining columns (i.e., columns V2-3) in FIG. 2.

The gates of optical signal transfer switches M511, M512, and M513 are commonly connected to a first transfer signal input terminal PTS1 respectively. Moreover, the gates of optical signal transfer switches M521, M522, and M523 are commonly connected to a second transfer signal input terminal PTS2 respectively. The first transfer signal input terminal PTS1 and the second transfer signal input terminal PTS2 are each supplied with a signal voltage based on the timing described below.

The connection point between the optical signal transfer switch M511 and the optical signal storage capacitor CTS11 is connected to the horizontal output line 130 through the horizontal transfer switch M611. The connection point between the optical signal transfer switch M521 and the optical signal storage capacitor CTS21 is connected to a horizontal output line 130 through a horizontal transfer switch M621. Horizontal transfer switches M611 and M621 are controlled by a horizontal scan circuit block 121. There is a similar configuration of the remaining columns V2-3 in FIG. 2.

Figure 3:
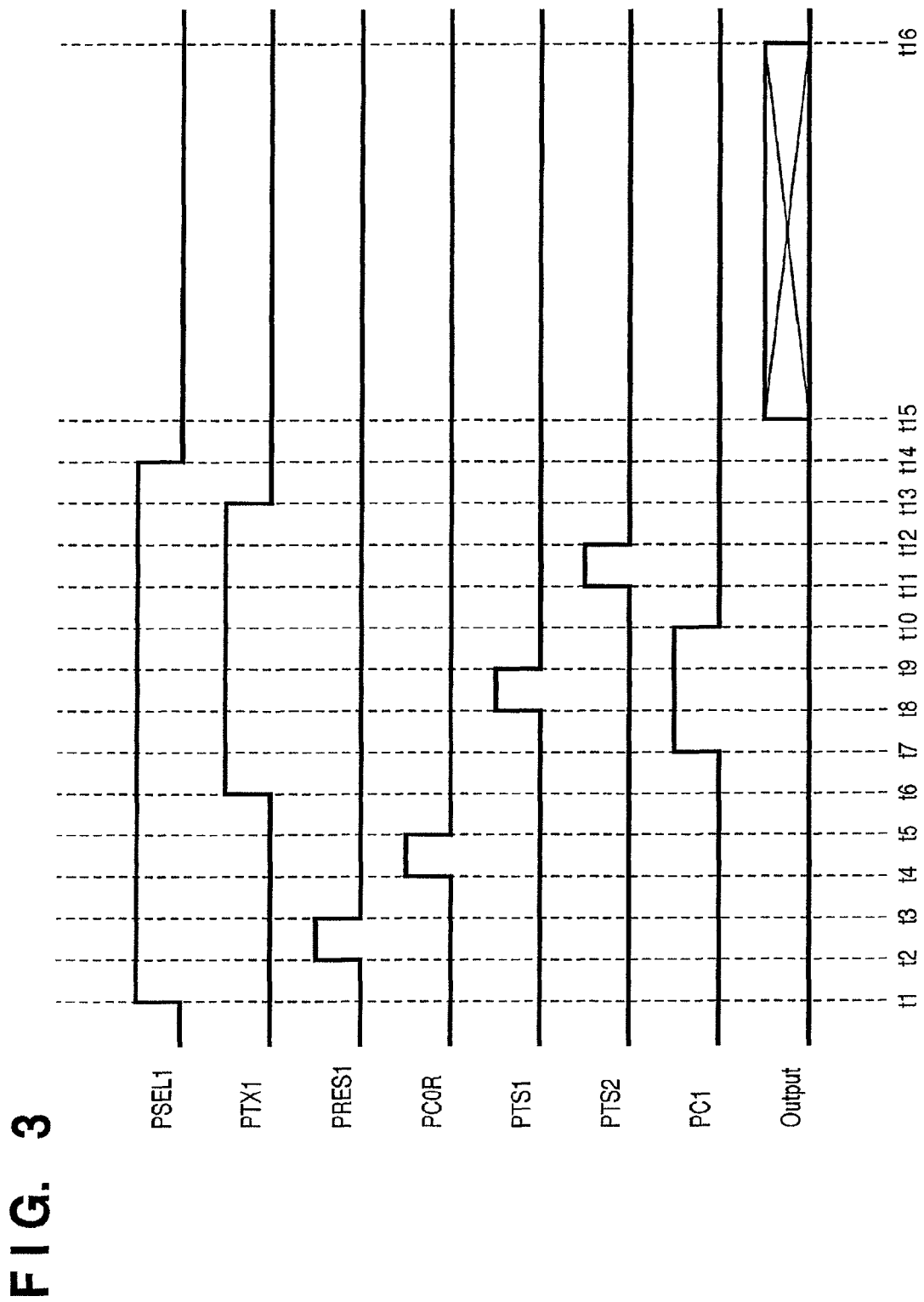
FIG. 3 is a timing diagram showing the operation according to the first embodiment of the present invention.

Next, the operation in the present embodiment will be explained with reference to FIG. 3.

At time t1, the row selection pulse PSEL1 is changed to a high level.

At time t2, the pixel reset pulse PRES1 is changed to a high level, and the gates of the amplification MOS transistors M311-313 are reset by the reset power source.

At time t3, the pixel reset pulse PRES1 is changed to a low level.

At time t4, a clamp pulse PCOR is changed to a high level, and the vertical output lines V1-3 read out the noise signal. As a result, the noise signal is clamped by the capacitors C01-C03.

At time t5, the clamp pulse PCOR is changed to a low level.

At time t6, the transfer pulse PTX1 is changed to a high level, and the optical signals (output signals) of the photodiodes D11, D12, and D13 are transferred to the gates of the amplification MOS transistors M311, M312, and M313, while at the same time these optical signals are read out by the vertical output lines V1, V2, and V3.

At time t7, the switching element PC1 is turned on by a high level control signal, and the first sensor gain is set by the capacitors C11 and C21 of the gain controller G1.

At time t8, the transfer pulse PTS1 is changed to a high level, and the optical signals of the photodiodes D11, D12, and D13 are transferred to capacitors CTS11, CTS12, and CTS13.

At time t9, the transfer pulse PTS1 is changed to a low level.

During the operation from time t1 through t9, the optical signal, generated by subjecting the output signal from the pixel cell connected in the first row to the first gain, is stored in the optical signal storage capacitors CTS11, CTS12, and CTS13, which are connected to each column.

At time t10, the switching element PC1 is turned off by a low-level control signal, and the second sensor gain, which is different from the first sensor gain, is set by the capacitor C21 of the gain controller G1.

At time t11, the transfer pulse PTS2 is changed to a high level, and the optical signals of photodiodes D11, D12, and D13 are transferred to CTS21, CTS22, and CTS23.

At time t12, the PTS2 is changed to a low level.

At time t13, the transfer pulse PTX2 is changed to a low level.

During the operation from time t10 through t13, the optical signal generated by subjecting the output signal from the pixel cell connected in the first row to the first gain, is stored in the optical signal storage capacitors CTS21, CTS22, and CTS23, which are connected to each column.

At time t14, the row selection pulse PSEL1 is changed to a low level.

Between times t15 and t16, by means of signals from the horizontal scan circuit block 121, the control signals applied to the gates of horizontal transfer switches M611, M612, and M613, in each column, as well as the control signals applied to the gates of M621, M622, and M623, are changed to a high level sequentially. First, the voltages stored in the optical signal storage capacitors CTS11, CTS12 and CTS13 are read out, followed by the reading out of the voltages stored in the optical signal storage capacitors CTS21, CTS22, and CTS23 to the horizontal output line, followed by the serial outputting to the output terminal OUT.

Figure 4:
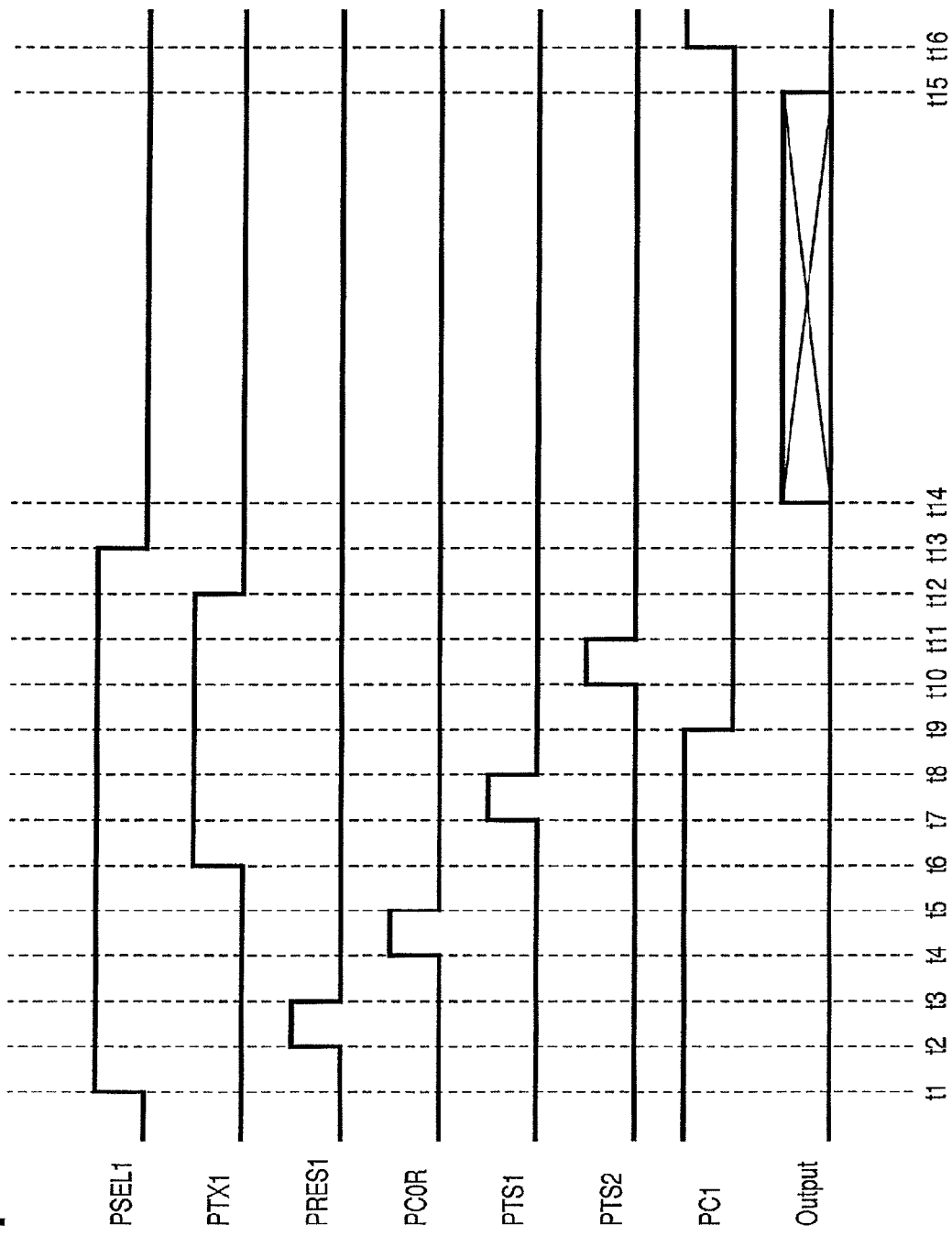
FIG. 4 is a timing diagram showing the operation according to the first embodiment of the present invention.

Furthermore, in the present embodiment, the driving of the switching element PC1 can be performed as shown in FIG. 4. In FIG. 4, the interval during which the control signal, supplied to a switching element PC1, is changed to a high level is different from that of FIG. 3. The control signal applied to the switching element PC1 should be at a high level before the second transfer signal input terminal PTS2 is changed to a high level, and at some point during the interval in which the first transfer signal input terminal PTS1 is at a high level. However, it is not limited to the driving method of FIGS. 3 and 4.

Thus, according to the present embodiment, a plurality of outputs that differ in gain can be obtained from a single signal from a photodiode, so there may be robust variation in the threshold values of the gain circuit.

Moreover, since the gain circuit has a plurality of gains, the S/N ratio can be improved by raising the gain setting near the optimal light amount and by decreasing the gain setting on the high-intensity side. As a result, the enlargement of the dynamic range can be realized. In this instance, the signal is compressed during development on the high-intensity side, and the circuit noise is also compressed at this time. Thus, an image that has a high degree of reproducibility on the high-intensity side can be obtained in one shooting.

Here, the enlargement of the dynamic range is carried out by a signal processing circuit 8 in FIG. 1.

The plurality of signals with different gains outputted from the image capturing apparatus 3 are inputted to the signal processing circuit 8 through the CDS circuit 4 and the A/D converter 5. Here, the gains are A and B (A>B), where the signal multiplied by A is the first signal and the signal multiplied by B is the second signal.

The second signal is multiplied by A/B at the signal processing circuit, where it is determined which first signal has a signal that is smaller than the predetermined value (saturation level). Then, a single image is generated by using the first signal and the second signal, which is the first signal multiplied by A/B and corresponds to the region greater than the predetermined value.

Second Embodiment

Figure 5:
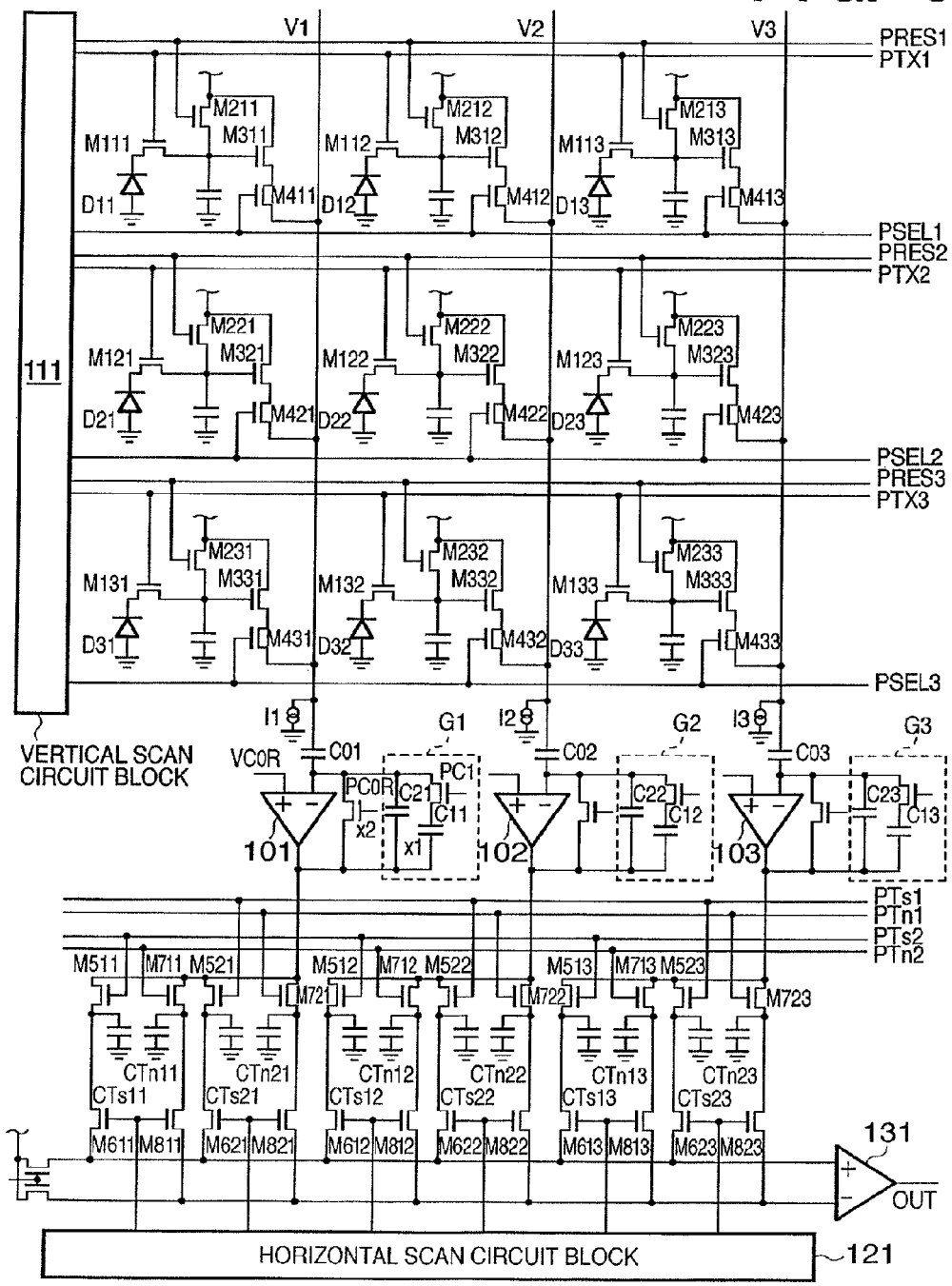
FIG. 5 shows an equivalent circuit of the image capturing apparatus according to a second embodiment of the present invention.

FIG. 5 is a drawing of an equivalent circuit diagram of the image capturing apparatus of the preferred second embodiment. The output terminal of an operational amplifier 101 is connected to the first signal holding unit group for temporarily holding the optical signal through the optical signal transfer switch, and to the second signal holding unit group for temporarily holding the noise signal through the noise signal transfer switch. In FIG. 5, the output terminal of the operational amplifier 101 is connected to a capacitor CTs11 of the first signal holding unit group through an optical signal transfer switch M511. The output terminal of the operational amplifier 101 is connected to a capacitor CTn11 of the second signal holding unit group through a noise signal transfer switch M711. In addition, the output terminal of the operational amplifier 101 is connected to a capacitor CTs21 of the first signal holding unit group through an optical signal transfer switch M521. The output terminal of the operational amplifier 101 is connected to a capacitor CTn21, which is included in the second signal holding unit group, through the noise signal transfer switch M721.

The opposite terminals of the optical signal storage capacitors CTs11 and CTs21, as well as those of the noise signal storage capacitors CTn11 and CTn21, are grounded.

A similarly configured read out circuit is set up for remaining columns V2-3 shown in FIG. 5.

The gates of noise signal transfer switches M711, M712, and M713 are commonly connected to a first transfer signal input terminal PTn2 respectively. Further, the gates of noise signal transfer switches M721, M722, and M723 are commonly connected to a second transfer signal input terminal PTs1 respectively.

The gates of optical signal transfer switches M511, M512, and M513 are commonly connected to the first transfer signal input terminal PTs1 respectively. Further, the gates of optical signal transfer switches M521, M522, and M523 are commonly connected to a transfer signal input terminal PTs2 respectively.

A signal voltage is supplied to transfer signal input terminals PTn1, PTn2, PTs1, and PTs2, according to the timing stated below.

The connection point between the noise signal transfer switch M711 and the noise signal storage capacitor CTn11 is connected to the inverting input terminal of a horizontal read out circuit block 131 through a horizontal transfer switch M811. The connection point between the noise signal transfer switch M721 and the noise signal storage capacitor CTn21 is connected to the inverting input terminal of the horizontal read out circuit block 131 through a horizontal transfer switch M821.

The connection point between the optical signal transfer switch M511 and the optical signal storage capacitor CTs11 is connected to the non-inverting input terminal of the horizontal read out circuit block 131 through a horizontal transfer switch M611. The connection point between the optical signal transfer switch M521 and the optical signal storage capacitor CTs21 is connected to the non-inverting input terminal of the horizontal read out circuit block 131.

Horizontal transfer switches M611, M621, M811, and M821 are controlled by a horizontal scan circuit block 121.

The remaining columns V2-3 shown in FIG. 2 are also similarly arranged.

Figure 6:
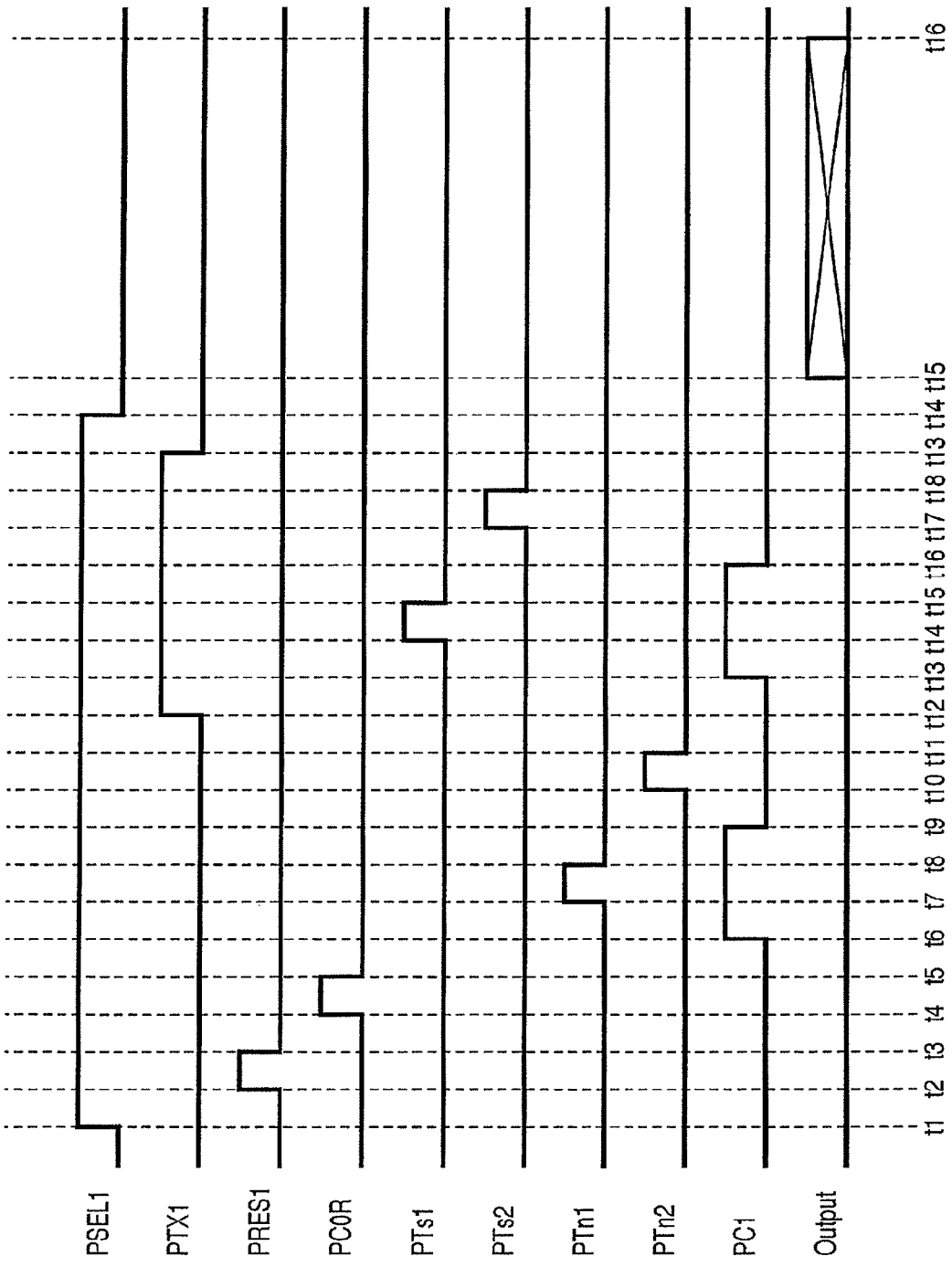
FIG. 6 is a timing diagram showing the operation according to the second embodiment of the present invention.

Next, the operations involved in the present embodiment will be explained using FIG. 6.

At time t1, a row selection pulse PSEL1 is changed to a high level.

At time t2, a pixel reset pulse PRES1 is changed to a high level, and the gates of amplification MOS transistors M311-313 are reset by the reset power source.

At time t3, the pixel reset pulse PRES1 is changed to a low level.

At time t4, a clamp pulse POOR is changed to a high level, the noise signal is read out by vertical output lines V1-3 and is clamped by capacitors C01-C03.

At time t5, the clamp pulse PCOR is changed to a low level.

At time t6, a switching element PC1 is turned on by a high level control signal, and the first sensor gain is set by capacitors C11 and C21 of a gain controller G1.

At time t7, the transfer pulse PTn1 is changed to a high level, and the noise signal from the cells including the photodiodes D11, D12, and D13 are transferred to noise signal storage capacitors CTn11, CTn12, and CTn13.

At time t8, the transfer pulse PTs1 is changed to a low level.

The operations of time t1-t8 result in the noise signals, generated from applying the first gain on the output signal from the pixel cell connected to the first row, being stored in the optical signal storage capacitors CTn11, CTn12, and CTn13 connected to each column.

At time t9, the switching element PC1 is turned off by a low level control signal, and the second sensor gain, which differs from the first sensor gain, is set by the capacitor C21 of the gain controller G1.

At time t10, the transfer pulse PTn2 is changed to a high level, and the noise signal from the cells including photodiodes D11, D12, and D13 are transferred to the capacitors CTn21, CTn22, and CTn23.

At time t11, PTn2 is changed to a low level.

The operations of time t9-t11 result in the noise signals, generated from applying the second gain, which differs from the first gain, on the output signal from the pixel cell connected to the first row, being stored in the noise signal storage capacitors CTn21, CTn22, and CTn23 connected to each column.

At time t12, a transfer pulse PTX1 is changed to a high level. The optical signals of the photodiodes D11, D12, and D13 are transferred to the gates of the amplification MOS transistors M311, M312, and M313. At the same time, these optical signals are read out by the vertical output lines V1, V2, and V3.

At time t13, the switching element PC1 is turned on by a high level control signal, and the first sensor gain is set by the capacitors C11 and C21 of the gain controller G1.

At time t14, the transfer pulse PTs1 is changed to a high level, and the optical signals of the photodiodes D11, D12, and D13 are transferred to the capacitors CTs11, CTs12, and CTs13.

At time t15, the transfer pulse PTs1 is changed to a low level.

The operations of time t12-t15 result in the optical signals, generated from applying the first gain on the output signal from the pixel cell connected to the first row, being stored in the optical signal storage capacitors CTn11, CTn12, and CTn13 connected to each column.

At time t16, the switching element PC1 is turned off by a low level control signal, and the second sensor gain, which differs from the first sensor gain, is set by the capacitor C21 of the gain controller G1.

At time t17, the transfer pulse PTs2 is changed to a high level, and the optical signals of the photodiodes D11, D12, and D13 are transferred to CTs21, CTs22, and CTs23.

At time t18, PTs2 is changed to a low level.

At time t19, a transfer pulse PTX2 is changed to a low level.

The operations of time t16-t19 result in the optical signals, generated from applying the second gain, which differs from the first gain, on the output signal from the pixel cell connected to the first row, being stored in the optical signal storage capacitors CTn21, CTn22, and CTn23 connected to each column.

At time t20, the row selection pulse PSEL1 is changed to a low level.

Between time t21 and t22, the control signals to the gates of horizontal transfer switches M611, M612, and M613 are changed to a high level by a signal from the horizontal scan circuit block 121, followed by a similar change to the control signals to the gates of horizontal transfer switches M621, M622, and M623. The voltage stored in the optical signal storage capacities CTs11-CTs13 and CTs21-CTs23, and the noise signal storage capacitors CTn11-CTn13 and CTn21-CTn23, are successively read out by the horizontal read out circuit block. Moreover, the difference between the optical signal and the noise signal are each outputted to the output terminal OUT by the horizontal read out circuit block 131.

Figure 7:
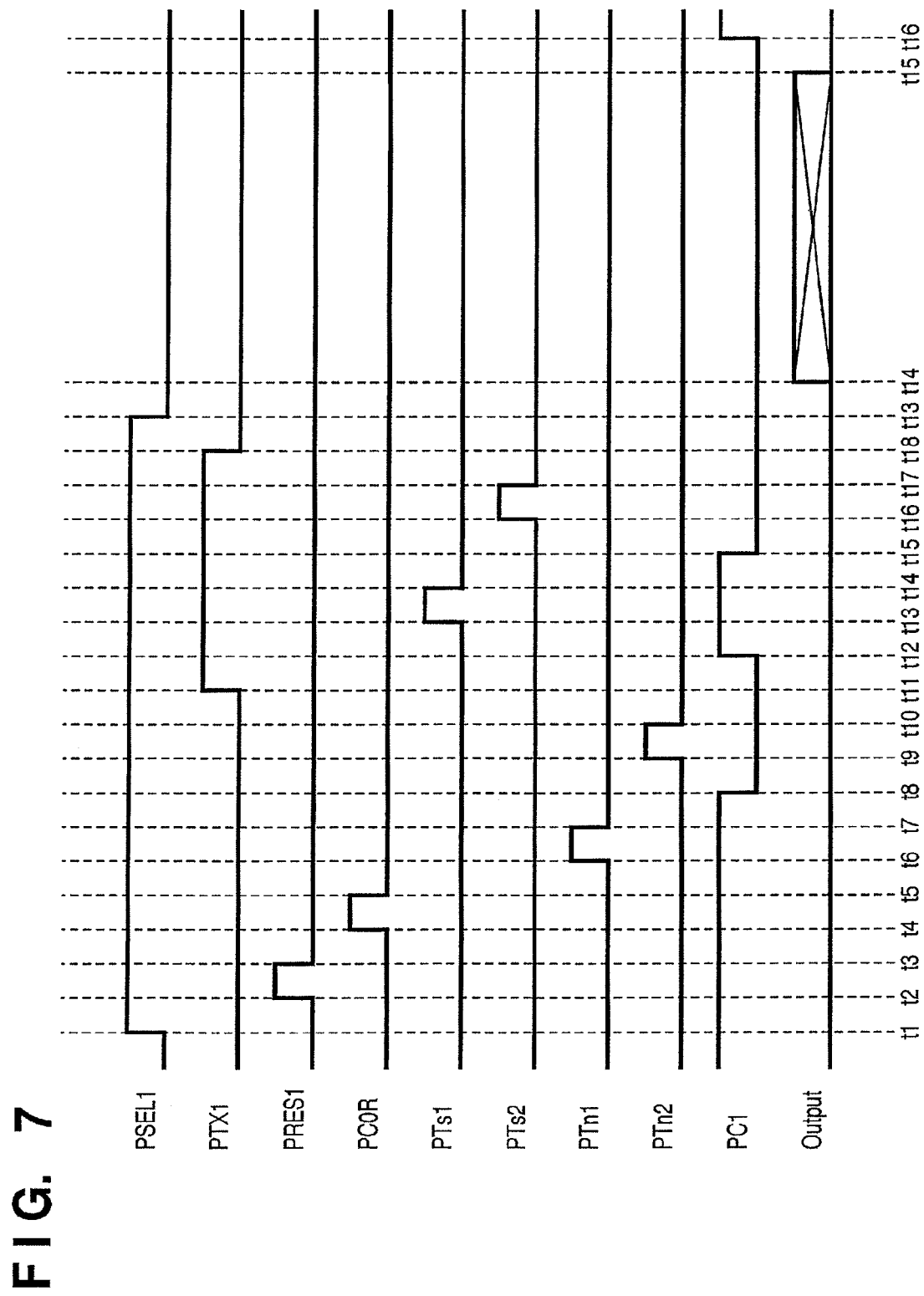
FIG. 7 is a timing diagram showing the operation according to the second embodiment of the present invention.
Figure 8:
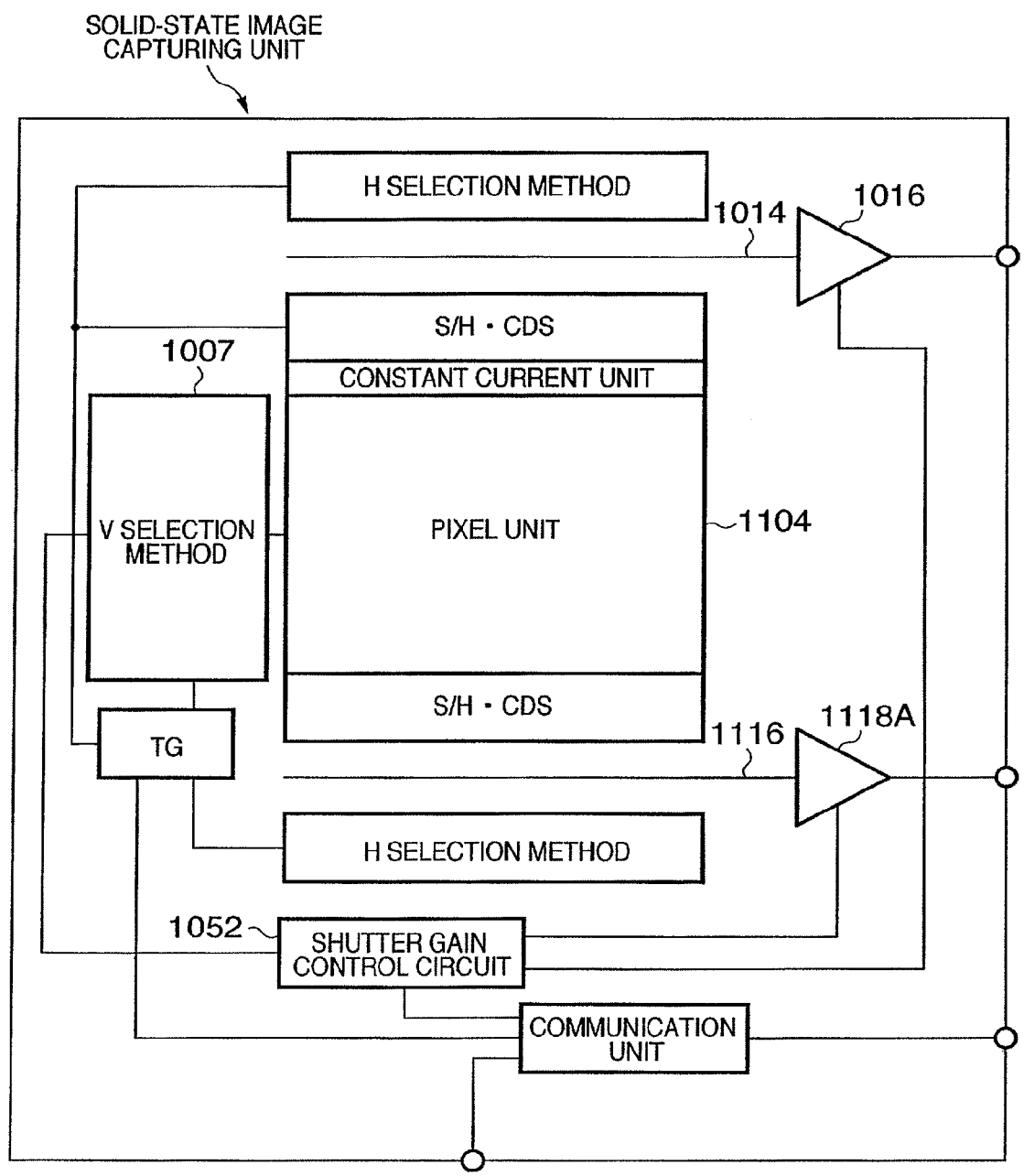
FIG. 8 is a block diagram showing the arrangement of a conventional image capturing system.

Further, according to the present embodiment, the driving of the switching element PC1 can be carried out as in FIG. 7. FIG. 7 differs from FIG. 6 with respect to the interval in which the control signal to the switching element PC1 is changed to a high level, in the interval in which the row selection line PTX1 is off. During the interval in which the control signal to the row selection line PTX1 is off, the control signal applied to the switching element PC1 may be changed to a high level before the second transfer signal input terminal PTn2 is at a high level and during when the first transfer signal input terminal PTn1 is at high level. Therefore, the present embodiment is not limited to the driving methods of FIGS. 6 and 7.

As mentioned above, according to the present embodiment, the noise signal of the pixel cell can be effectively removed by setting up a capacitor to temporarily store the noise signal of the pixel cell.

Here, the process of dynamic range enlargement is carried out by the signal processing circuit 8 of FIG. 1.

The plurality of signals that differ in gain that are outputted by the image capturing apparatus 3 are inputted into the signal processing circuit 8 through the CDS circuit 4 and the A/D converter 5. Here, the gain is represented as A and B (A>B) and the first signal is the signal that has been multiplied by A, while the second signal is the signal that has been multiplied by B.

The signal processing circuit multiplies the second signal by A/B and distinguishes the first signal that is smaller than the predetermined value (saturation value). Next, a single image is generated by using the first signal and the second signal which has been multiplied by A/B and which corresponds to a region larger than the predetermined value.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2006-006447, filed Jan. 13, 2006, which is hereby incorporated by reference herein in its entirety.

What is claimed is:

1. An image sensor comprising:
a plurality of pixels, each having a photoelectric conversion element therein, which are arranged in a row direction and a column direction;
a row selection unit configured to select a row of the plurality of pixels arranged in the row direction;
a plurality of column output lines configured to read out signals from the row of the plurality of pixels selected by the row selection unit in the column direction;
a plurality of gain circuits, each of which is connected to each column output line, and is configured to amplify the signals readout by the column output line by a plurality of different gains;
a plurality of signal holding units configured to separately hold signals amplified by the plurality of different gains by the gain circuit, wherein the plurality of signal holding units are connected to each column output line; and a row output line configured to read the signals held in the plurality of signal holding units of the plurality of column output lines in the row direction.

2. An image sensor according to claim 1, wherein each gain circuit includes

N capacitors connected in parallel; and

N−1 switching elements connected in series with at least N−1 capacitors of the N capacitors, where N is an integer equal to or greater than 2.

3. An image sensor according to claim 1, wherein each of the pixels further comprises:

a transfer switching element configured to transfer an output signal from the photoelectric conversion element, the transfer switching element being connected to an output terminal of the photoelectric conversion element, wherein the plurality of signal holding units include a first signal holding unit group and a second signal holding unit group, wherein the plurality of signal holding units hold the plurality of signals in the first signal holding unit group if the transfer switching elements are turned on, and the plurality of signal holding units hold the plurality of signals in the second signal holding unit group if the transfer switching elements are turned off.

4. An image sensor according to claim 1, further comprising a plurality of gain adjuster configured to respectively adjust gains of the plurality of gain circuits in N stages, wherein N is an integer equals to or greater than 2.

5. An image capturing system comprising:

an image sensor as described in claim 1; and a signal processing unit configured to generate an image from the signals that have been amplified by the plurality of different gains and outputted from the row output line.

6. An image capturing system according to claim 5, further comprising an optical system configured to form an object image on the image sensor.

* * * * *